United States Patent
Ye et al.

(10) Patent No.: US 7,271,571 B2
(45) Date of Patent: Sep. 18, 2007

(54) ANTI-ISLANDING PROTECTION SYSTEMS FOR SYNCHRONOUS MACHINE BASED DISTRIBUTED GENERATORS

(75) Inventors: Zhihong Ye, Schenectady, NY (US); Pengwei Du, Troy, NY (US); John Keith Nelson, Niskayuna, NY (US); Nicholas Wright Miller, Delmar, NY (US); Reigh Allen Walling, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/670,067

(22) Filed: Feb. 1, 2007

(65) Prior Publication Data

US 2007/0126428 A1  Jun. 7, 2007

Related U.S. Application Data

(62) Division of application No. 10/966,665, filed on Oct. 15, 2004, now Pat. No. 7,202,638.

(51) Int. Cl.
*H02J 3/00* (2006.01)
*H02P 9/00* (2006.01)

(52) U.S. Cl. .............................. 322/36; 322/37; 307/31
(58) Field of Classification Search ................. 322/17, 322/22, 23, 24, 28, 36, 37; 307/31, 32
See application file for complete search history.

(56) References Cited

U.S. PATENT DOCUMENTS

| | | | |
|---|---|---|---|
| 6,137,187 A | 10/2000 | Mikhail et al. | |
| 6,219,623 B1 | 4/2001 | Wills | |
| 6,380,719 B2* | 4/2002 | Underwood et al. | 322/36 |
| 6,411,065 B1* | 6/2002 | Underwood et al. | 322/20 |
| 6,429,546 B1* | 8/2002 | Ropp et al. | 307/31 |
| 6,603,290 B2* | 8/2003 | Hochgraf | 322/37 |
| 6,700,356 B1* | 3/2004 | Dorn | 322/44 |
| 6,815,932 B2 | 11/2004 | Wall | |
| 6,864,595 B2 | 3/2005 | Wall | |
| 7,016,793 B2 | 3/2006 | Ye et al. | |
| 7,038,329 B1 | 5/2006 | Fredette et al. | |
| 7,202,638 B2* | 4/2007 | Ye et al. | 322/37 |

OTHER PUBLICATIONS

SK Salam, et al., "Monitoring Changes in System Variables Due to Islanding Condition and Those Due to Disturbances at the Utilities Network", 1999 IEEE, pp. 460-465.
MA Redfern, et al., "Protection Against Loss of Utility Grid Supply for Dispersed Storage and Generation Unit", IEEE Trans on Power Delivery, vol. 8, No. 3, Jul. 1993.

* cited by examiner

Primary Examiner—Nicholas Ponomarenko
(74) Attorney, Agent, or Firm—Ann M. Agosti; Patrick K. Patnode

(57) ABSTRACT

A system for providing anti-islanding protection of a synchronous machine based distributed generator includes a frequency sensor configured to generate a generator frequency signal, a bandpass filter configured for filtering the generator frequency signal, a governor controller configured for using the filtered frequency signal to generate a power feedback signal, and a governor summation element configured for summing the filtered frequency signal, the power feedback signal, and a reference power to provide an electrical torque signal. Another system includes a voltage sensor configured to generate a generator terminal voltage signal, a feedback power calculator configured for generating a reactive feedback power signal, a bandpass filter configured for filtering the terminal voltage signal, and a PI controller summation element configured for summing the filtered terminal voltage signal, the reactive power feedback signal, and a reference reactive power to provide an error signal.

7 Claims, 6 Drawing Sheets

ANTI-ISLANDING PROTECTION SYSTEMS FOR SYNCHRONOUS MACHINE BASED DISTRIBUTED GENERATORS

CROSS REFERENCE TO RELATED APPLICATIONS

This application is a Division of U.S. patent application Ser. No. 10/966,665 entitled "Anti-Islanding Protection Systems for Synchronous Machine Based Distributed Generators" filed Oct. 15, 2004, now U.S. Pat. No. 7,202,638 which is herein incorporated by reference.

STATEMENT REGARDING FEDERALLY SPONSORED RESEARCH & DEVELOPMENT

This invention was made with Government support under NREL contract number NAD-1-30605-01 and DOE contract number DE-AC36-99GO10337. The Government has certain rights in the invention.

BACKGROUND

The invention relates generally to systems for anti-islanding protection of a synchronous machine based distributed generator from a feeder having been disconnected from an electrical grid.

The distribution of electric power from utility companies to customers utilizes a network of utility lines connected in a grid-like fashion, referred to as an electrical grid. The electrical grid includes independent energy sources energizing the grid in addition to utility companies energizing the grid, with each independent energy source being referred to as a distributed generator (DG). A typical DG includes some type of power conditioner or converter, such as an inverter for example, that feeds power to the feeder system of the grid. Exemplary DGs include but are not limited to energy storage devices (such as batteries or flywheels, for example), photovoltaics, micro-turbines, fuel cells, engine-generator sets, and wind-turbine-generator sets. A conventional feeder system typically includes distribution lines that provide power from the grid or DG to a customer load via electrical disconnects and distribution transformers. Even with the presence of a DG connected to the grid, the utility company is still the main source of power and in many cases controls the system voltage and frequency within nominal values.

Under certain conditions, the utility power source may be disconnected from the grid and feeder system, leaving the DG directly tied to the load or disjointed grid branch, which is referred to as islanding. The isolated section of the grid being powered by the DG is referred to as an island. Unintentional islanding results in a situation where the voltages and frequencies on the disjointed grid branch are outside of the direct control of the utility company because that branch is primarily energized by one or more DGs. Accordingly, monitoring and disconnect schemes, referred to as anti-islanding schemes, are used to timely disconnect a DG from the feeder in the event that grid power from a utility company has been disconnected from the feeder.

Anti-islanding schemes presently used or proposed include passive schemes and active schemes. Passive schemes are based on local monitoring of the grid signals, such as under or over voltage, under or over frequency, rate of change of frequency, phase jump, or system harmonics, for example. Active schemes are based on active signal injection with monitoring of the resulting grid signals, such as impedance measurement for example, or active signal injection with active controls, such as active frequency shifting or active voltage shifting for example. With passive schemes, close power matching between the DG output and the total load may result in a sustained island due to the voltage and frequency holding within nominal ranges. With active schemes, some distortion may occur in the output current waveform, thereby resulting in a tradeoff between islanding detection time and waveform distortion, with faster detection typically resulting in higher total harmonic distortion (THD). Accordingly, there is a need in the art for an anti-islanding arrangement that reduces these drawbacks.

BRIEF DESCRIPTION

Briefly, in accordance with one embodiment of the present invention, a system for providing anti-islanding protection of a distributed generator with respect to a feeder connected to an electrical grid comprises: a frequency sensor configured to generate a generator frequency signal representative of a rotational speed of the generator, a bandpass filter configured for filtering the generator frequency signal, a governor controller configured for using the filtered frequency signal to generate a power feedback signal, and a governor summation element configured for summing the filtered frequency signal, the power feedback signal, and a reference power to provide an electrical torque signal for use by a prime mover coupled to the generator.

In accordance with another embodiment of the present invention, a system for providing anti-islanding protection of a distributed generator with respect to a feeder connected to an electrical grid comprises a voltage sensor configured to generate a terminal voltage signal representative of a terminal voltage of the generator, a feedback power calculator configured for generating a reactive feedback power signal, a bandpass filter configured for filtering the terminal voltage signal, and a proportional-integral (PI) controller summation element configured for summing the filtered terminal voltage signal, the reactive power feedback signal, and a reference reactive power to provide an error signal for use by a proportional integral controller in generating a voltage reference signal ($V_{ref}$) for the generator.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
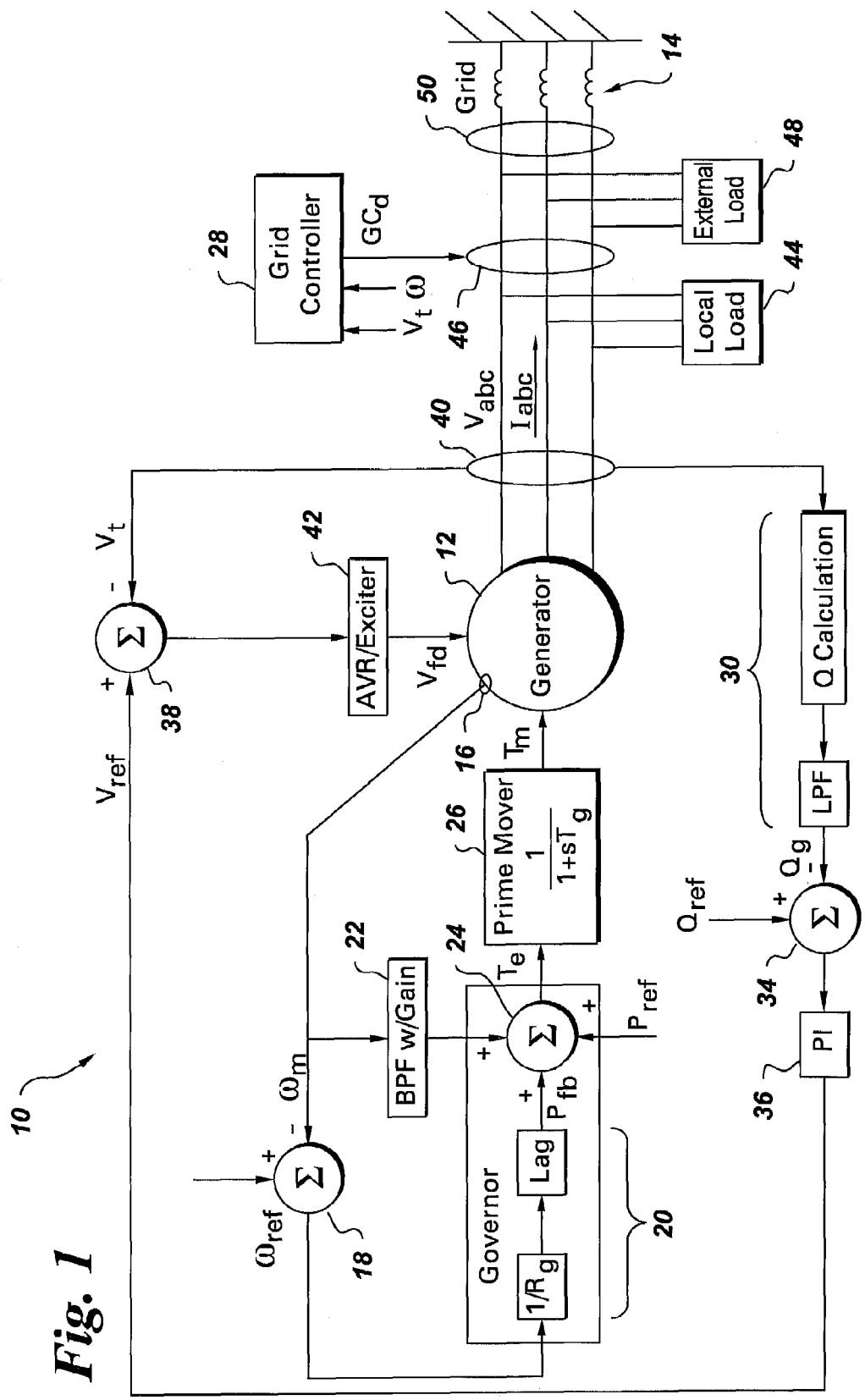
FIG. 1 is a block diagram of an active power anti-islanding protection system in accordance with one embodiment of the present invention.

FIG. 1 is a block diagram of an active power anti-islanding protection system 10 in accordance with one embodiment of the present invention wherein system 10 includes a frequency sensor 16 configured to generate a generator frequency signal $\omega_m$ representative of a rotational speed of a generator 12, a bandpass filter 22 configured for filtering the generator frequency signal, a governor controller 20 configured for using the filtered frequency signal to generate a power feedback signal $P_{fb}$, and a governor summation element 24 configured for summing the filtered frequency signal, the power feedback signal, and a reference power $P_{ref}$ to provide an electrical torque signal $T_e$ for use by a prime mover 26 coupled to generator 12. Typically frequency sensor 16 obtains electrical or mechanical measurements.

In a more specific embodiment, anti-islanding protection system 10 further includes a grid controller 28 configured for receiving the generator frequency signal and generating a grid disconnection signal ($GC_d$) upon the generator frequency signal becoming out of a nominal frequency range (typically, but not always, due to the opening of utility disconnect device 50). The grid disconnection signal can be used to control generator disconnect device 46 so as to disconnect generator 12 and local load 44 from external load 48 and grid 14, for example. Each of Local load 44 and external load 48 may comprise a passive or active load, for example.

In a still more specific embodiment, anti-islanding protection system 10 includes a frequency difference element 18 configured for obtaining a difference $\omega_{diff}$ between a reference frequency signal $\omega_{ref}$ and the generator frequency signal, and governor controller 20 is configured for using the difference in addition to the filtered frequency signal to generate the power feedback signal $P_{fb}$.

In one example, the governor dynamics (including the prime mover) are represented as $$\frac{dT_m}{dt} = \frac{1}{T_G}\left(P_{ref} + \frac{\omega_{ref} - \omega_m}{R_G} - T_m\right),$$

wherein $T_M$ represents the mechanical torque of the generator, $T_G$ represents the time constant of the prime mover, $P_{ref}$ represents the reference power, $\omega_{ref}$ represents the reference frequency signal, $\omega_m$ represents the generator frequency signal of generator 12, $R_G$ represents the governor droop, and t represents time.

Bandpass filter 22 typically has a range extending from about 0.1 Hz to about 100 Hz. In a more specific example the range extends from about 1 Hz to about 10 Hz. The filter gain and range are typically selected so that bandpass filter 22 is configured to increase the speed of detecting a change of the generator frequency signal upon a disruption to the electrical grid. More specifically, the desired effect of bandpass filter 22 is to cause the loop formed by frequency sensor 16, bandpass filter 22, governor summation element 24, prime mover 26, and generator 12 to accelerate the effects in any change of the generator frequency signal.

Even more specifically, bandpass filter 22 typically comprises a filter with a filter gain comprising a value that is greater than or equal to a gain required to result in a disconnected grid loop gain of greater than unity (0 decibels) and a connected grid loop gain of less than unity. The higher the filter gain, the more quickly the generator frequency signal will move outside the normal operational windows when the grid is disconnected and the more potential is created for oscillatory dynamic interactions with the grid when the grid is connected. The filter gain can be selected to balance the two objectives. One example model for such filter gain is as follows:

$$\xrightarrow{\Delta\omega} K\frac{sT_w}{(1+sT_w)(1+sT_1)} \xrightarrow{\Delta p}$$

wherein $\Delta\omega$ represents $\omega_{ref}$ minus $\omega_m$, K represents the filter gain, $T_w$ represents the high pass corner frequency of the bandpass filter, $T_1$ represents the low pass corner frequency, and $\Delta p$ represents a corresponding power difference between the resulting power and the reference power. The washout function serves as a high pass filter, with a time constant $T_w$ to allow signals with frequencies higher than $1/T_w$ to pass. Signals with frequencies lower than $1/T_w$ (especially DC signals) will be attenuated, and thus the loop impact is minimized for steady-state operation. The low pass filter corner frequency $T_1$ is set to attenuate high-frequency noise. The selection of filter gain K is a compromise between high enough gain (with some margin) to ensure islanding detection quickly and low enough gain (with some margin) to have minimal impact on the generator under grid-connected conditions.

Figure 4:
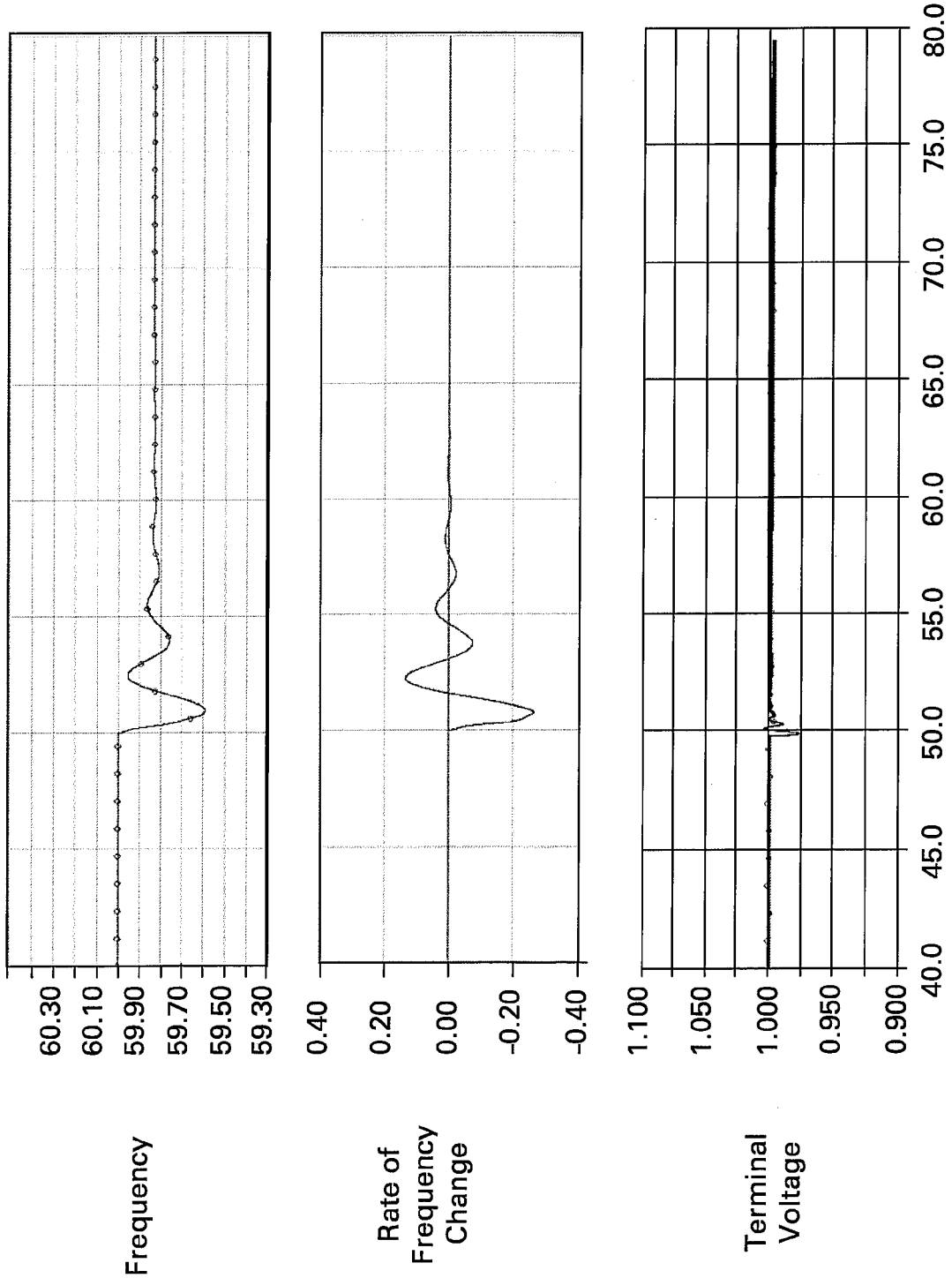
FIG. 4 is a graph illustrating terminal voltage, frequency, and rate of change of frequency without active anti-islanding control.
Figure 5:
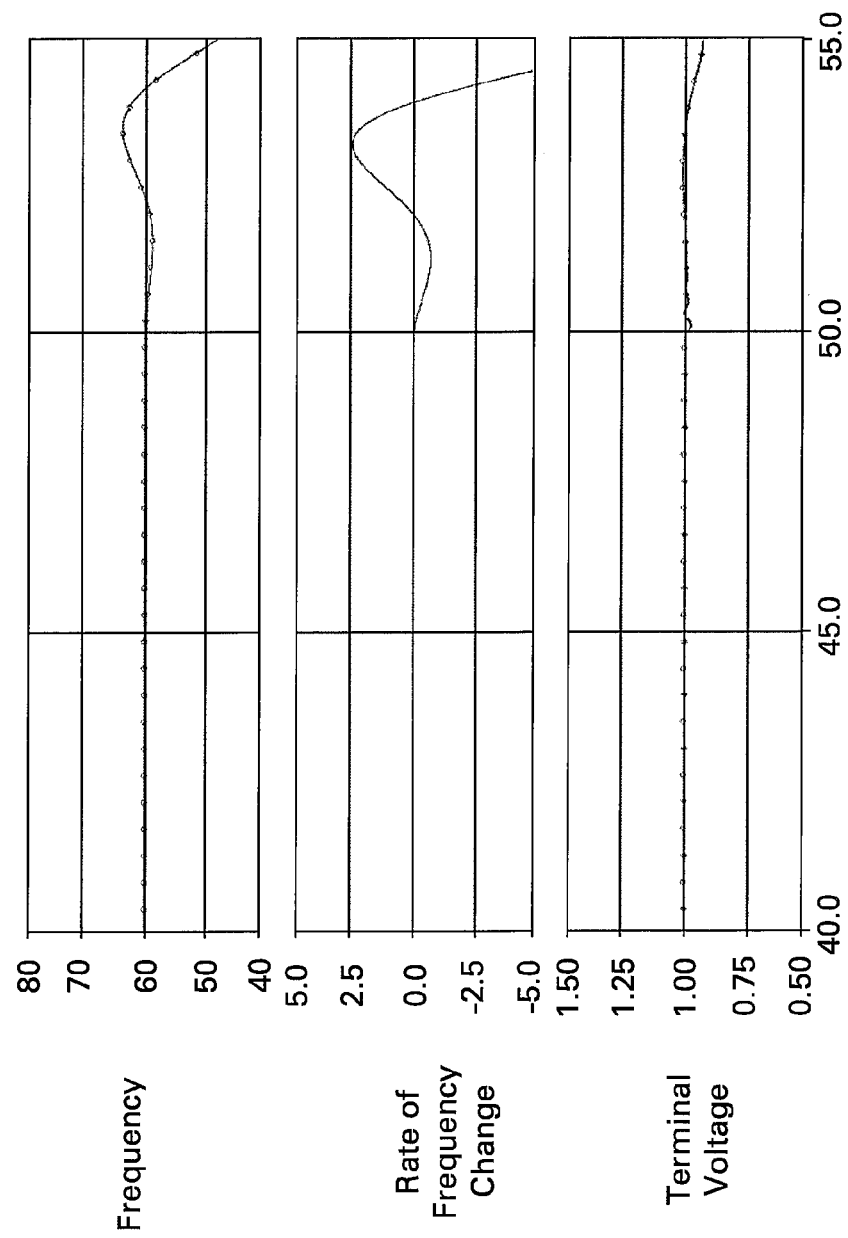
FIG. 5 is a graph illustrating terminal voltage, frequency, and rate of change of frequency with active power anti-islanding control.

The graph of FIG. 4 illustrates a simulation of terminal voltage, frequency, and rate of change of frequency without active anti-islanding control, and the graph of FIG. 5 illustrates simulated parameters with active power anti-islanding control. As can be seen in these figures, when using the active power anti-islanding control, the frequency (which started at 60 Hz in this example) at time=55 seconds is expected to drop to below 50 Hz as compared with a drop ranging from about 59.6 Hz to about 59.5 Hz in FIG. 4. Similar larger scale effects are also expected from the change in frequency portions of the graphs.

Figure 2:
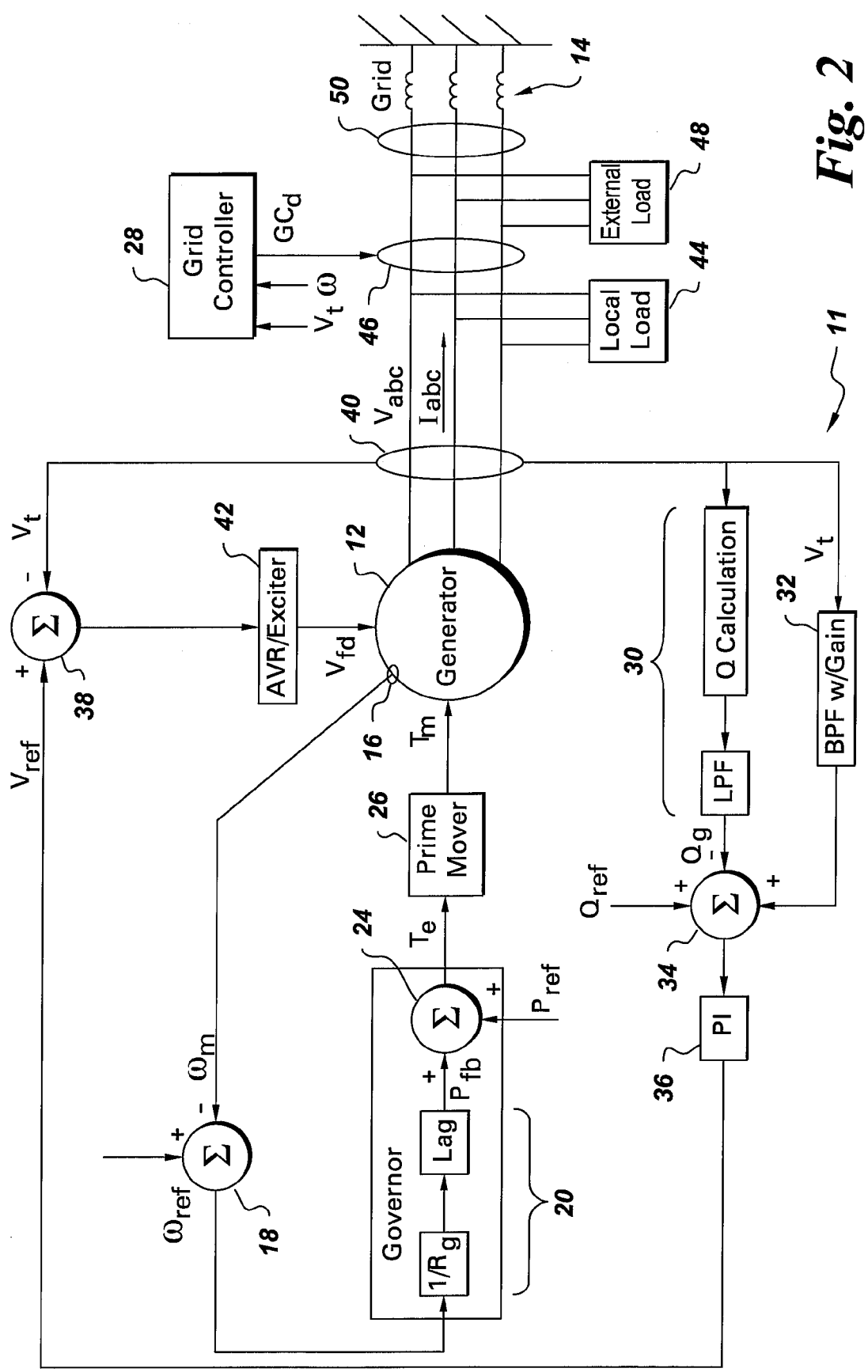
FIG. 2 is a block diagram of a reactive power anti-islanding protection system in accordance with another embodiment of the present invention.
Figure 3:
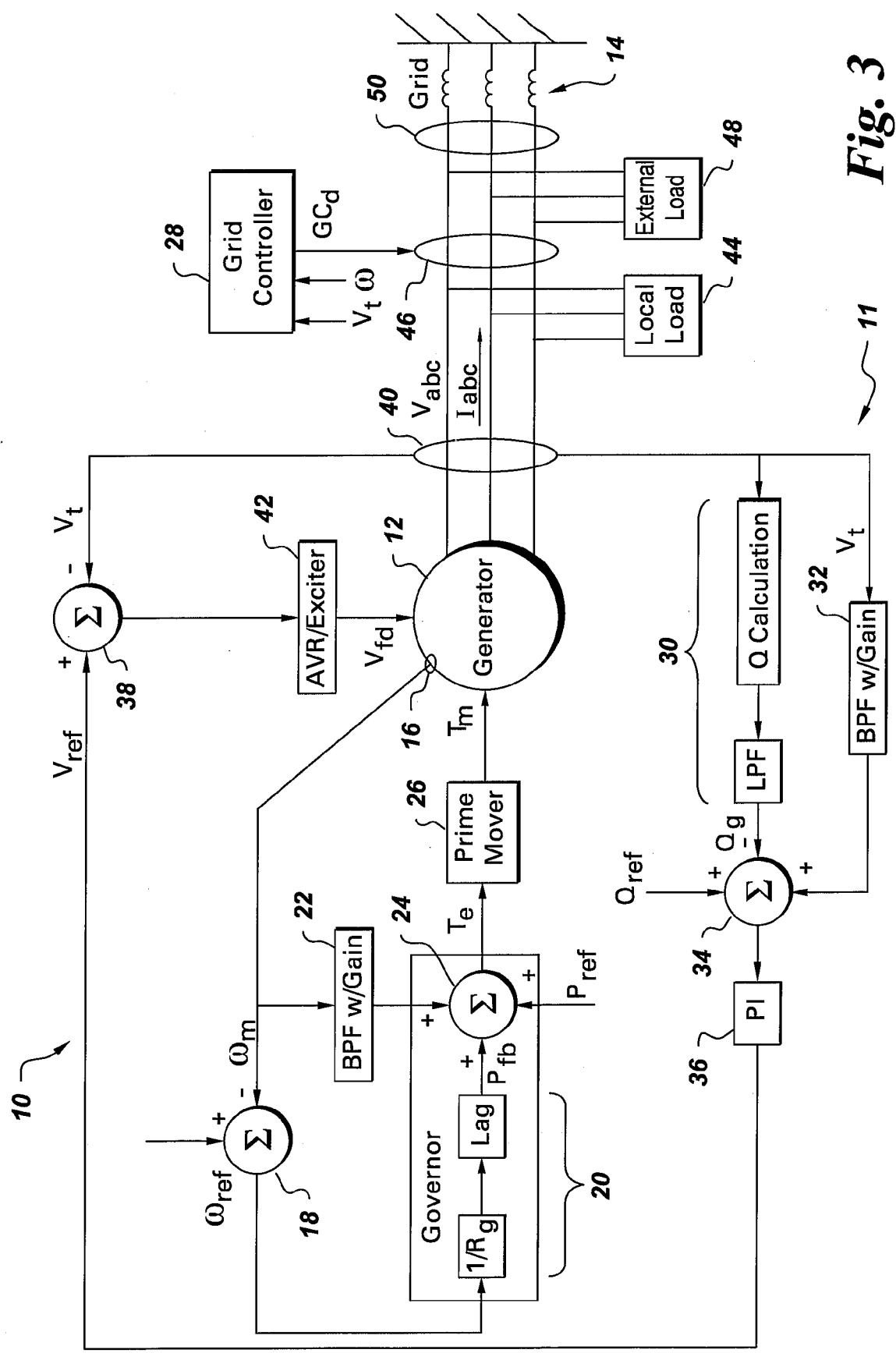
FIG. 3 is a block diagram of a combined active and reactive power anti-islanding protection system in accordance with another embodiment of the present invention.

FIG. 2 is a block diagram of a reactive power anti-islanding protection system 11 in accordance with another embodiment of the present invention which may be implemented either alone or, as shown in FIG. 3, in combination with the embodiment of FIG. 1. In the embodiment of FIG. 2, system 11 comprises a voltage sensor 40 configured to generate a terminal voltage signal $V_t$ representative of a terminal voltage of the generator, a feedback power calculator 30 configured for generating a reactive feedback power signal $Q_g$, a bandpass filter 32 configured for filtering the terminal voltage signal, a proportional-integral (PI) controller summation element 34 configured for summing the filtered terminal voltage signal, the reactive power feedback signal, and a reference reactive power $Q_{ref}$ to provide an error signal for use by a proportional integral controller 36 in generating a voltage reference signal $V_{ref}$ for generator 12.

In a more specific embodiment, anti-islanding protection system 11 further comprises grid controller 28 which is configured for receiving the terminal voltage signal and generating a grid disconnection signal upon the terminal voltage signal becoming out of a nominal terminal voltage range.

Bandpass filter 32 typically has a range extending from about 0.1 Hz to about 100 Hz. In a more specific example the range extends from about 1 Hz to about 10 Hz. The filter gain and range are typically selected so that bandpass filter 32 is configured to increase the speed of detecting a change of the terminal voltage upon a disruption to the electrical grid. More specifically, the desired effect of bandpass filter 32 is to cause the loop formed by terminal voltage sensor 40, bandpass filter 32, feedback power calculator 30, PI controller summation element 34, PI controller 36, a voltage regulator summation element 38, an exciter 42, and generator 12 to accelerate the effects in any change of the terminal voltage signal.

Even more specifically, in a similar manner as discussed with respect to bandpass filter 22 of FIG. 1, bandpass filter 32 typically comprises a filter with a gain comprising a value that is greater than or equal to a gain required to result in a disconnected grid loop gain of greater than unity (0 decibels) and a connected grid loop gain of less than unity. The higher the filter gain, the more quickly the terminal voltage will move outside the normal operational windows when the grid is disconnected and the more potential is created for oscillatory dynamic interactions with the grid when the grid is connected. The filter gain can be selected to balance the two objectives. One example model for such filter gain is as follows:

$$\xrightarrow{\Delta V} K \frac{sT_w}{(1+sT_w)(1+sT_1)} \xrightarrow{\Delta q}$$

wherein $\Delta V$ represents $V_{ref}$ minus $V_t$, K represents the filter gain, $T_w$ represents the high pass corner frequency of the bandpass filter, $T_1$ represents the low pass corner frequency, and $\Delta q$ represents $Q_{ref}$ minus $Q_g$. The washout function serves as a high pass filter, with a time constant $T_w$ to allow signals with frequencies higher than $1/T_w$ to pass. Signals with frequencies lower than $1/T_w$ (especially DC signals) will be attenuated, and thus the loop impact is minimized for steady-state operation. The low pass filter corner frequency $T_1$ is set to attenuate high-frequency noise. The selection of filter gain K is a compromise between high enough gain (with some margin) to ensure islanding detection quickly and low enough gain (with some margin) to have minimal impact on the generator under grid-connected conditions. Although it is possible that the filter gain of bandpass filter 32 of FIG. 2 might be the same as the filter gain of bandpass filter 22 of FIG. 1, typically the various compromises will result in different filter gains for bandpass filters 22 and 32.

Most generators are equipped with an exciter 42 such as an AVR (automatic voltage regulator) type exciter. AVRs maintain the terminal voltage of the generator at a specific value by reactive (or power factor) regulation. In the embodiment of FIG. 2, feedback PI controller 36 is cascaded in combination with exciter 42 to regulate the reactive power of generator 12 so that, when the grid is connected, the reactive power output of the generator will follow the desired reference value.

Figure 6:
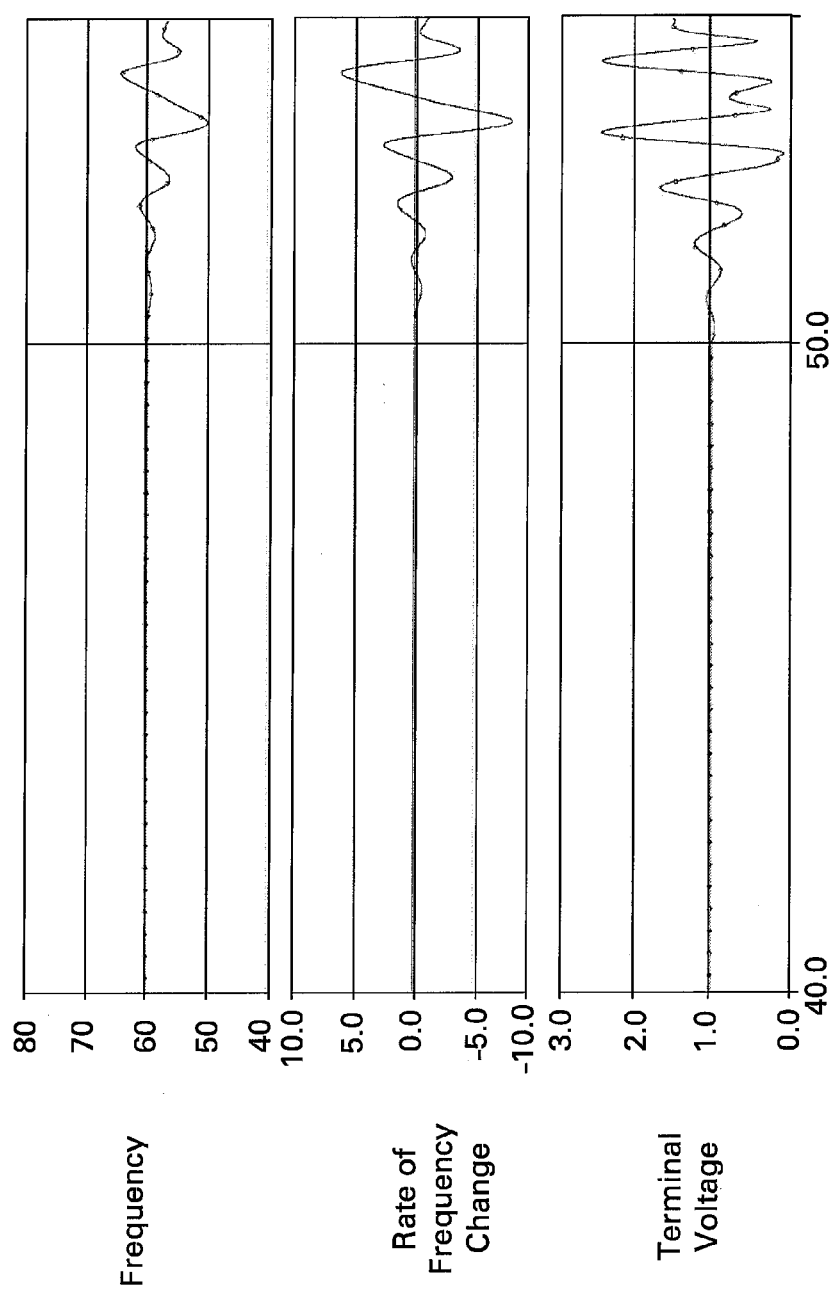
FIG. 6 is a graph illustrating terminal voltage, frequency, and rate of change of frequency with reactive power anti-islanding control.

As can be seen in comparison to the simulations in the graphs shown in FIG. 4, in the simulations shown in the graphs of FIG. 6, which illustrate the system with reactive power anti-islanding control, the effect on voltage measurements dramatically increases with the reactive control. The reactive power anti-islanding control embodiment additionally appears to have the potential to result in an increased effect on the frequency and change of frequency portions of the graphs as well. Therefore, in some embodiments, controller 28 may additionally or alternatively be configured for receiving a generator frequency signal representative of the rotating frequency of generator 12 and generating a grid disconnection signal upon the generator frequency signal becoming out of a nominal frequency signal range.

FIG. 3 is a block diagram of a combined active and reactive power anti-islanding protection system in accordance with another embodiment of the present invention. In the embodiment of FIG. 3, the overall system is a combination of systems 10 and 11 and includes a frequency sensor 16 configured to generate a generator frequency signal $\omega_m$ representative of a rotational speed of the generator, an active loop bandpass filter 32 configured for filtering the generator frequency signal, a governor controller 20 configured for using the filtered frequency signal to generate a power feedback signal $P_{fb}$, a governor summation element 24 configured for summing the filtered frequency signal, the power feedback signal, and a reference power $P_{ref}$ to provide an electrical torque signal $T_e$ for use by a prime mover 26 coupled to the generator, a voltage sensor 40 configured to generate a terminal voltage signal $V_t$ representative of a terminal voltage of the generator, a feedback power calculator 30 configured for generating a reactive feedback power signal $Q_g$, a reactive loop bandpass filter 32 configured for filtering the terminal voltage signal, a proportional-integral controller summation element 34 configured for summing the filtered terminal voltage signal, the reactive power feedback signal, and a reference reactive power $Q_{ref}$ to provide an error signal for use by a proportional integral controller in generating a voltage reference signal $V_{ref}$ for the generator.

Each of the above FIG. 1 and FIG. 2 embodiment variations is also applicable in the embodiment of FIG. 3, and an optional common grid controller can be used. In this example, grid controller 28 is configured for receiving the generator frequency signal and generating a grid disconnection signal upon the generator frequency signal becoming out of a nominal frequency range, and the grid controller is further configured for receiving the terminal voltage signal and generating a grid disconnection signal upon the terminal voltage signal becoming out of a nominal terminal voltage range.

The previously described embodiments of the present invention have many advantages, including the ability to more quickly assess an unintended disconnection of a utility power source from a grid due to the positive feedback which is introduced to destabilize the frequency and/or voltage while having minimal effect in the presence of the grid.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for providing anti-islanding protection of a distributed generator with respect to a feeder connected to an electrical grid, the system comprising:

a voltage sensor configured to generate a terminal voltage signal representative of a terminal voltage of the generator;

a feedback power calculator configured for generating a reactive feedback power signal;

a bandpass filter configured for filtering the terminal voltage signal;

a proportional-integral controller summation element configured for summing the filtered terminal voltage signal, the reactive power feedback signal, and a reference reactive power to provide an error signal for use by a proportional integral controller in generating a voltage reference signal for the generator.

2. The system of claim 1 further comprising a grid controller configured for receiving the terminal voltage signal and generating a grid disconnection signal upon the terminal voltage signal becoming out of a nominal terminal voltage range.

3. The system of claim 2 wherein the bandpass filter comprises a filter gain comprising a value that is greater than or equal to a gain required to result in a disconnected grid loop gain of greater than unity.

4. The system of claim 3 wherein a range of the bandpass filter extends from about 0.1 Hz to about 100 Hz.

5. The system of claim 2 wherein the bandpass filter is configured to increase the speed of detecting a change of the terminal voltage signal upon a disruption to the electrical grid.

6. The system of claim 2 wherein the grid controller is further configured for receiving a generator frequency signal representative of the rotational speed of the generator and generating a grid disconnection signal upon the generator frequency signal becoming out of a nominal frequency range.

7. The system of claim 1 further comprising a grid controller configured for receiving a generator frequency signal representative of the rotating frequency of the generator and generating a grid disconnection signal upon the generator frequency signal becoming out of a nominal frequency range.

* * * * *